June 28, 1932.   D. G. BAKER   1,865,075
WINDING MACHINE
Filed Oct. 22, 1928   11 Sheets-Sheet 1
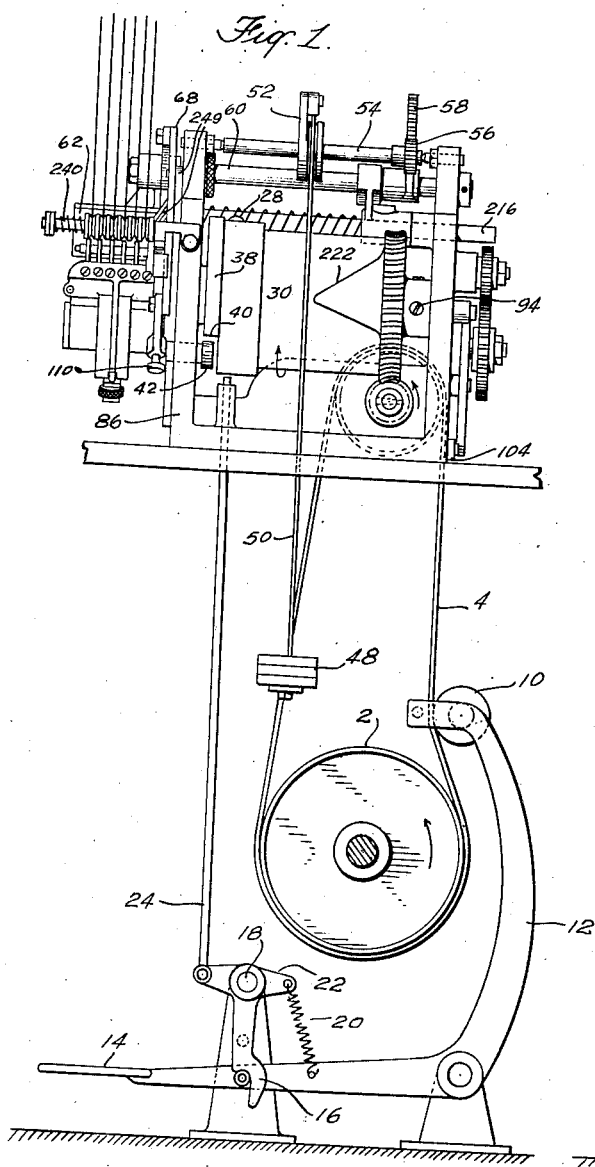
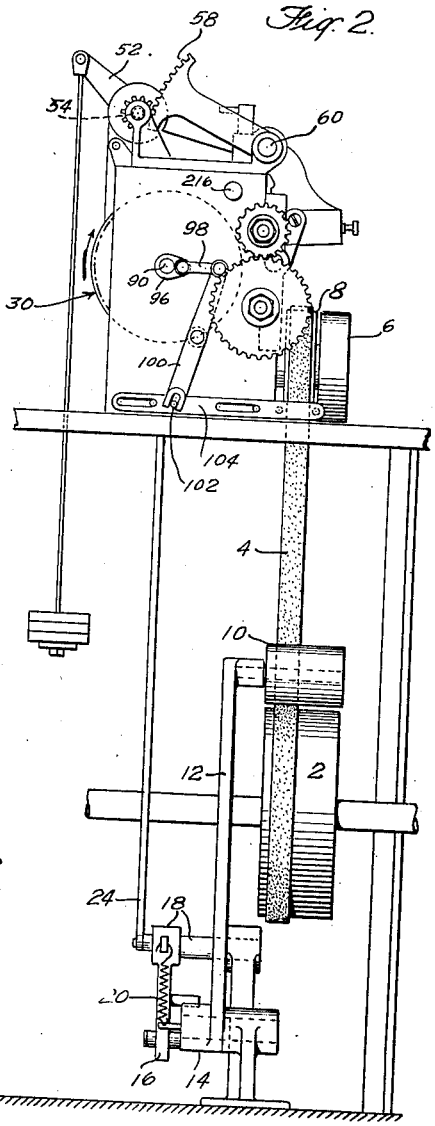
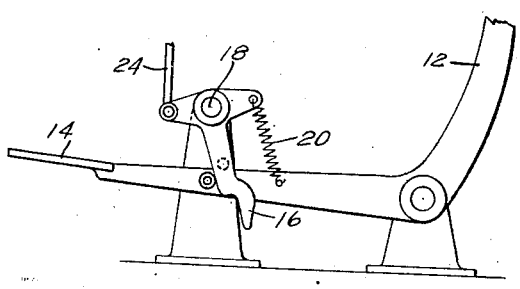
INVENTOR
D. G. BAKER
BY
ATTORNEYS

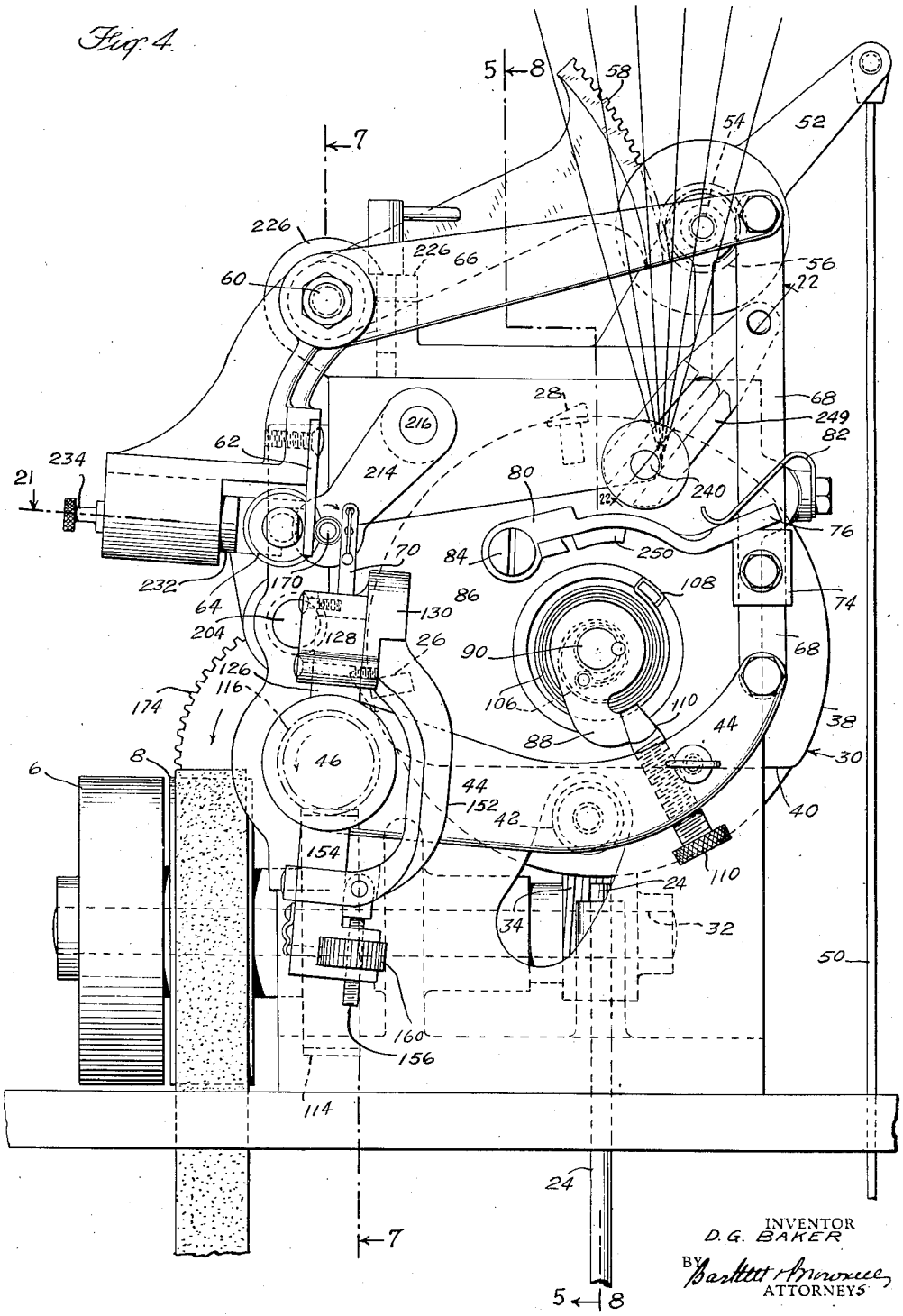

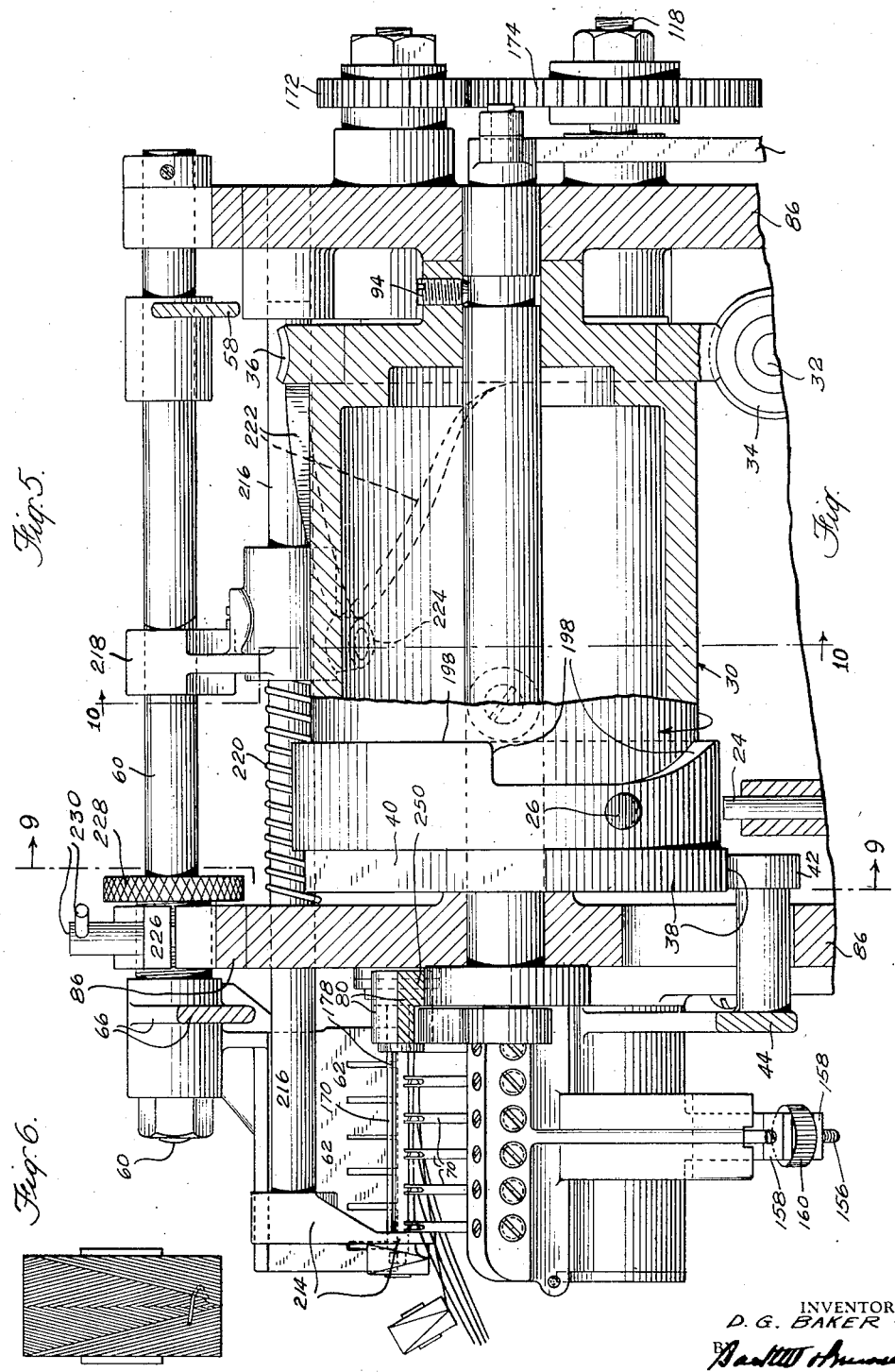

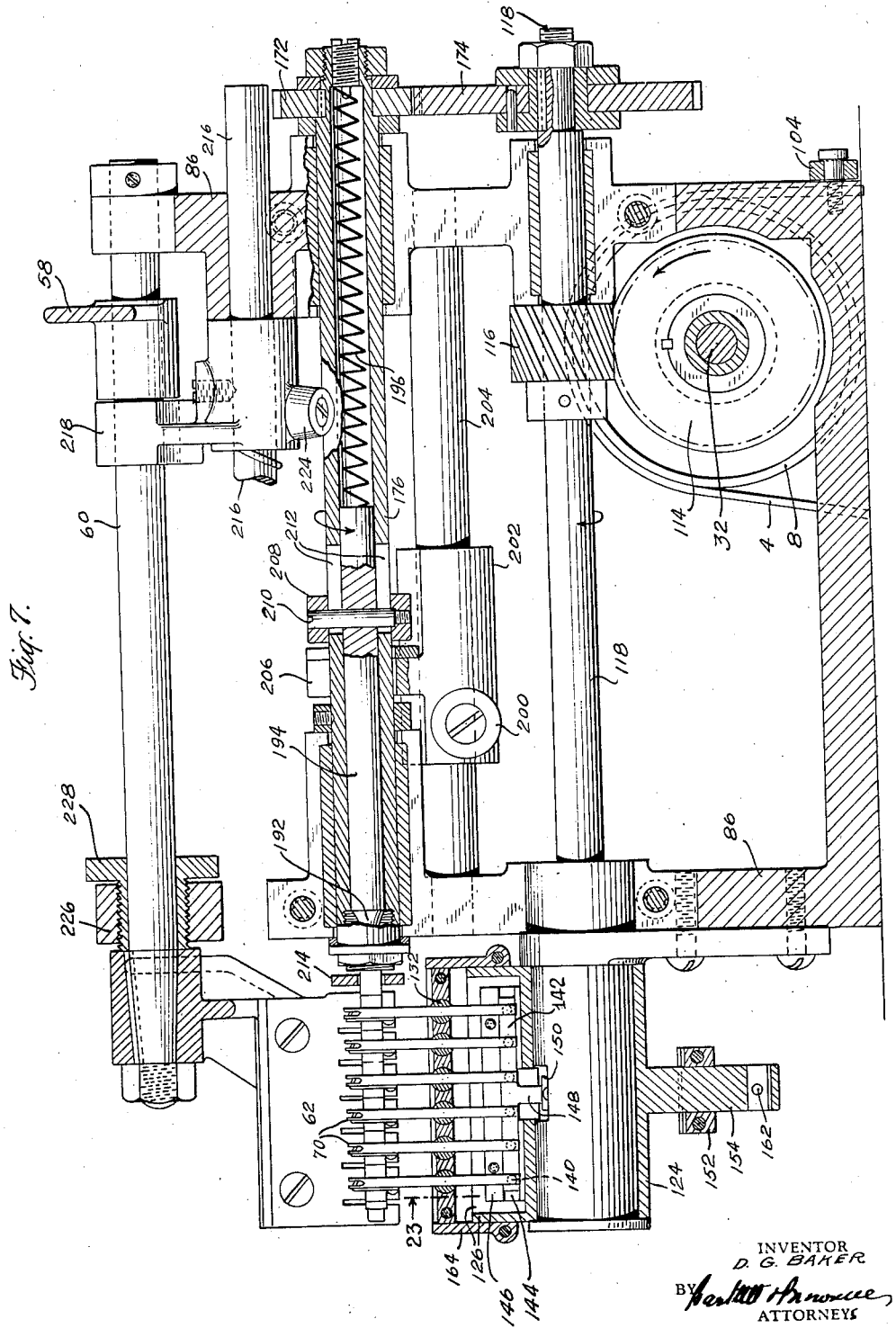

June 28, 1932.    D. G. BAKER    1,865,075
WINDING MACHINE
Filed Oct. 22, 1928    11 Sheets-Sheet 5

INVENTOR
D. G. BAKER
BY
ATTORNEYS

June 28, 1932. D. G. BAKER 1,865,075
WINDING MACHINE
Filed Oct. 22, 1928 11 Sheets-Sheet 7

INVENTOR
D. G. BAKER
BY
ATTORNEYS

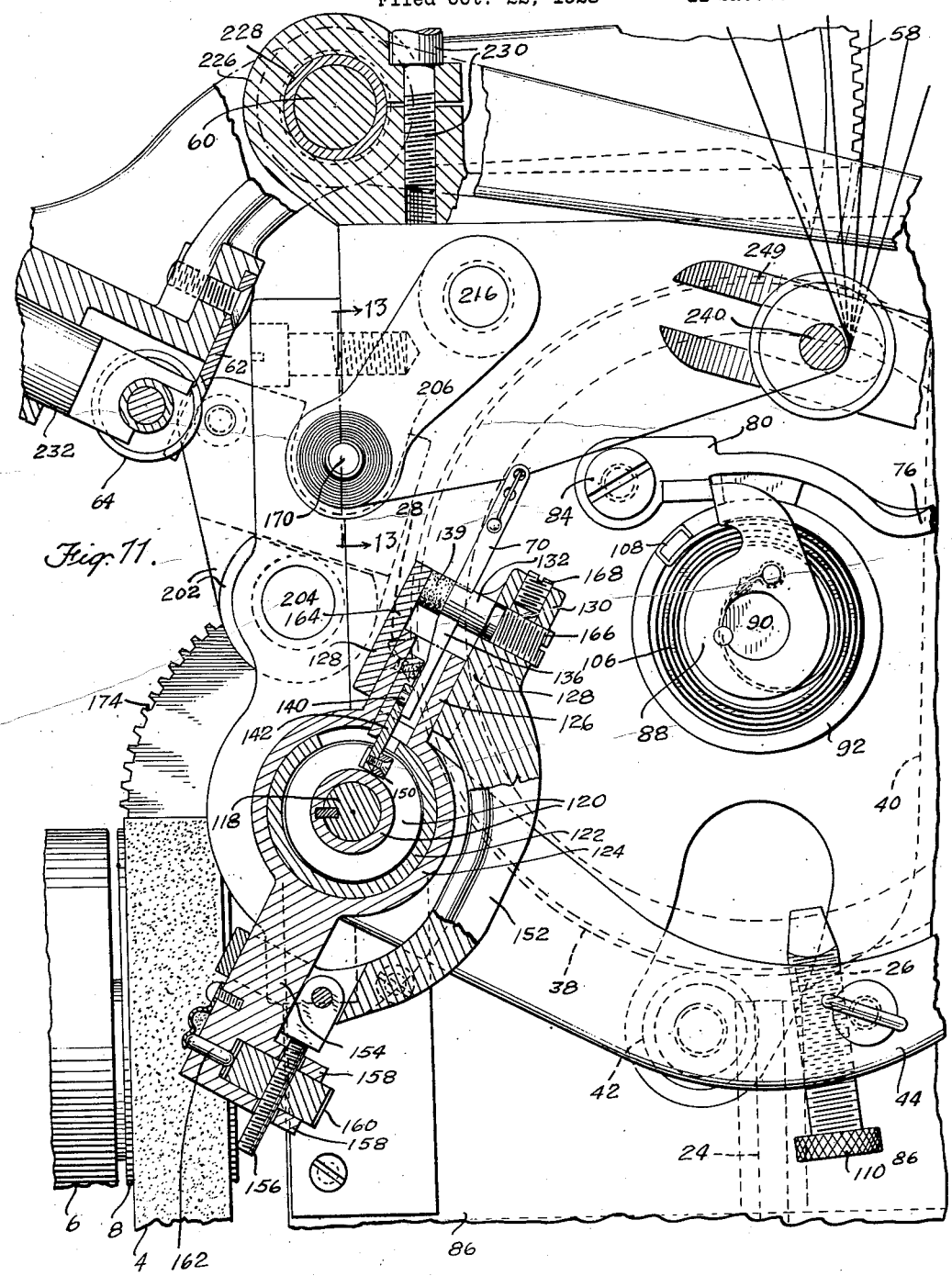

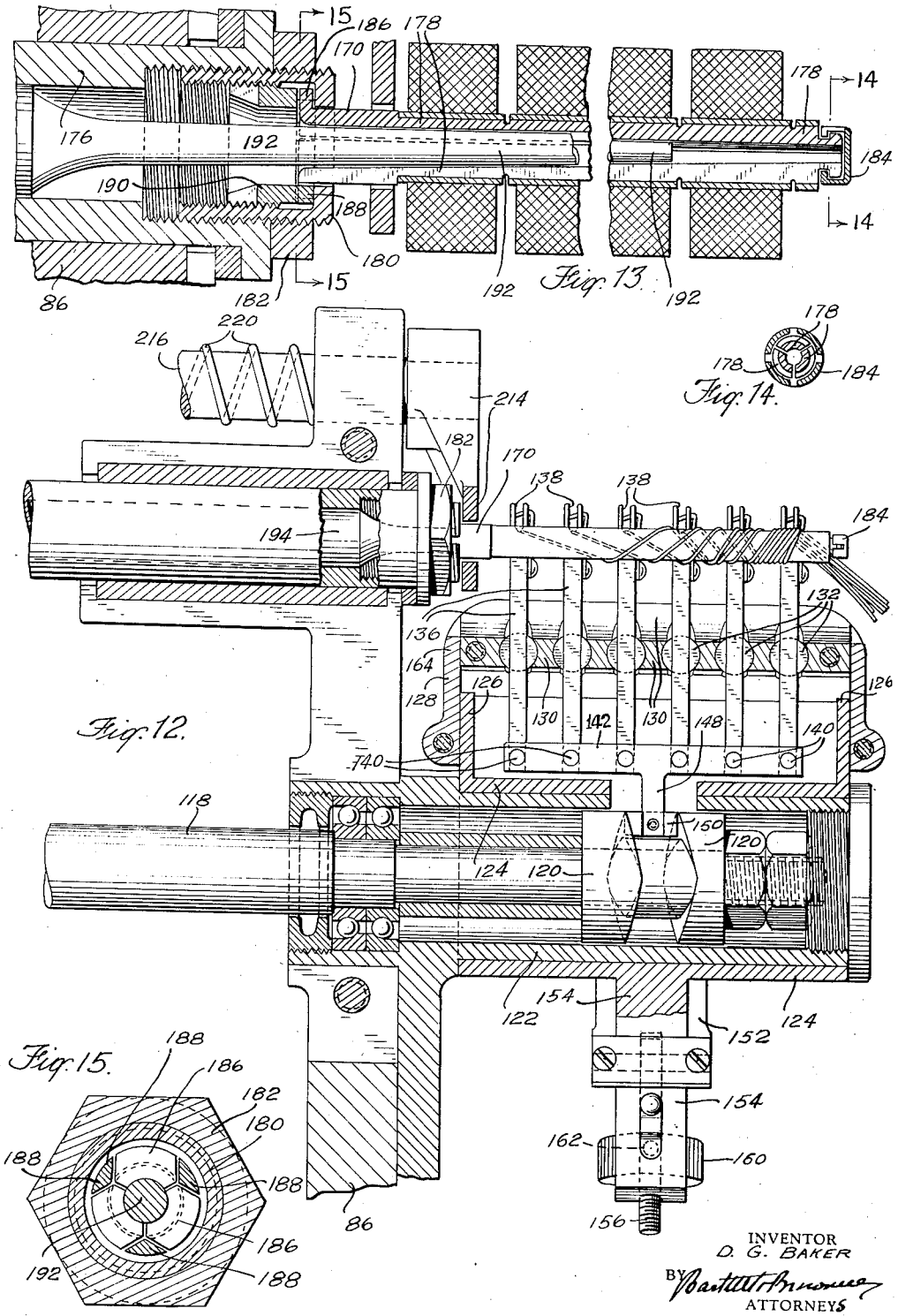

June 28, 1932.  D. G. BAKER  1,865,075
WINDING MACHINE
Filed Oct. 22, 1928  11 Sheets-Sheet 10

INVENTOR
D. G. BAKER
BY
ATTORNEYS

June 28, 1932.　　　D. G. BAKER　　　1,865,075
WINDING MACHINE
Filed Oct. 22, 1928　　　11 Sheets-Sheet 11

INVENTOR
D. G. BAKER
BY
ATTORNEYS

Patented June 28, 1932

1,865,075

UNITED STATES PATENT OFFICE

DICKERSON G. BAKER, OF HOLYOKE, MASSACHUSETTS, ASSIGNOR TO THE AMERICAN THREAD COMPANY, OF NEW YORK, N. Y., A CORPORATION OF NEW JERSEY

WINDING MACHINE

Application filed October 22, 1928. Serial No. 314,019.

My invention relates to improvements in winding machines and has for its object to provide what I term a "pantograph" winding machine on account of the system of levers used therein for controlling the traverse guide and pressure plate. It further has for its object to provide in a winding machine a new and improved means for severing into sections an extended tube placed upon the winding spindle. It further has for its object to provide a new and improved spindle, and further has for its object to provide a new and improved tension device. It further has for its object to provide a new and improved traverse guide for winding a plurality of cops, the throw of which can be easily adjusted to vary the thickness of the cop and for threads of various sizes.

The following is a description of an embodiment of my invention, reference being had to the accompanying drawings, in which:

Figure 1 shows in side elevation a machine embodying my invention;

Fig. 2 shows a rear elevation of the same;

Fig. 3 shows a detail of the treadle release mechanism;

Fig. 4 shows a front view of the machine on an enlarged scale;

Fig. 5 shows a portion of the machine partly in side elevation and partly in section on the line 5—5, Fig. 4;

Fig. 6 is a side elevation of the cop or package produced by the machine, the end of the winding having been fixed manually;

Fig. 7 shows a section of the machine on the line 7—7, Fig. 4;

Fig. 11 shows a machine partly in front elevation and partly in section;

Fig. 12 shows details of the machine with the spindle bearing and traverse cam bearing in section;

Fig. 13 is a sectional detail on the line 13—13 of Fig. 11;

Fig. 14 is a section on the line 14—14, Fig. 13;

Fig. 15 is a section on the line 15—15, Fig. 13;

Figure 8:
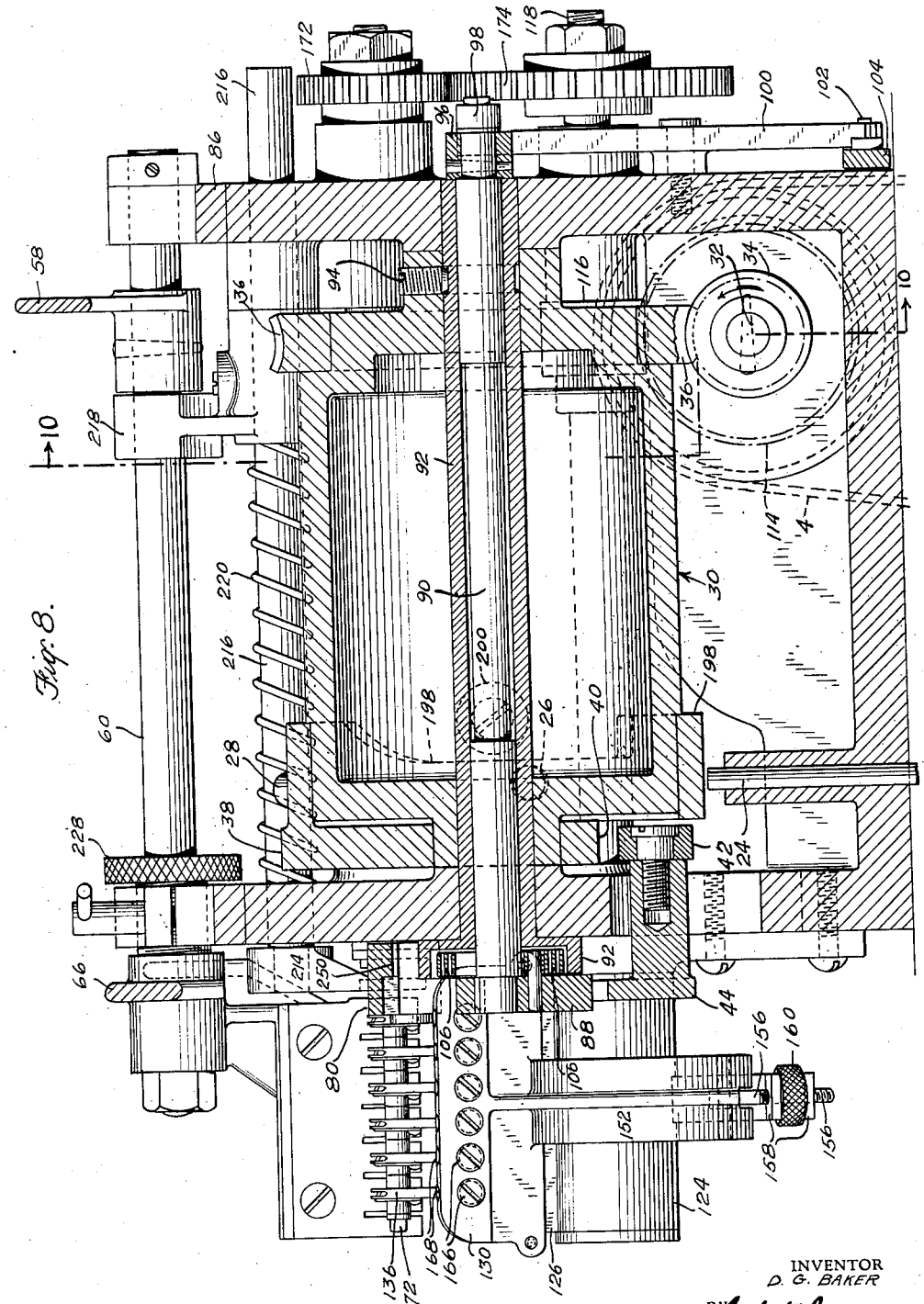
Fig. 8 shows a section of the machine on the line 8—8, Fig. 4.

Referring more particularly to the drawings, 2 is the main driving pulley of the machine carrying a belt 4 which when tightened drives the pulleys 6 and 8 one at a time. 10 is a belt tightener carried by the lever 12 operated by the treadle 14 for controlling the action of the belt 4. When the treadle is depressed the belt 4 is tightened so as to drive the pulley with which it engages and when raised the belt is loose so as not to drive such pulley. When the treadle is depressed it is engaged by the detent 16 pivotally mounted at 18 and moved into holding position by the spring 20 connected to one arm of a cross-head 22 to the other arm of which a rod 24 is connected. The upper end of this rod is adapted to be engaged by plug cams 26 and 28 on a cam drum 30 of the machine.

Figure 16:
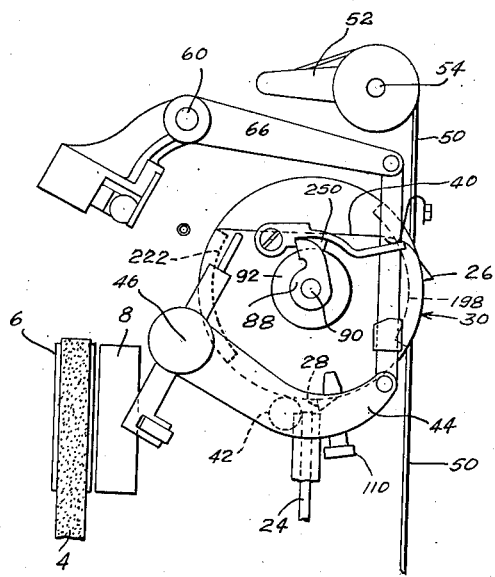
Fig. 16 is a diagrammatic view, showing the parts in initial starting positions.

When the machine is in initial position, as shown in Fig. 16, the belt is upon pulley 6. This pulley is mounted upon a shaft 32, shown in Fig. 10, which carries a worm gear 34 engaging with a gear 36 upon the cam drum 30. When the treadle 14 is depressed the worm 34 is revolved together with the cam drum 30. This cam drum carries a cam 38 having a flat side 40. This cam 38 engages a roller 42 upon a traverse lever arm 44 fulcrumed at 46. When the flat portion 40 comes opposite this roller 42 the traverse arm lever 44 is permitted to move upward under the influence of a weight 48. At other times the lever 44 is held in down position by the concentric portion of cam 38. The weight 48 is connected by a cable 50 to a crank arm 52 on the shaft 54. To this shaft is also connected a gear 56 which engages a segment 58 connected to a shaft 60, carrying a pressure plate 62 and revolving cutters 64. Combined with this shaft and the pressure plate so as to constitute a lever is an arm 66 which is connected by a link 68 to the traverse guide arm 44.

Figure 17:
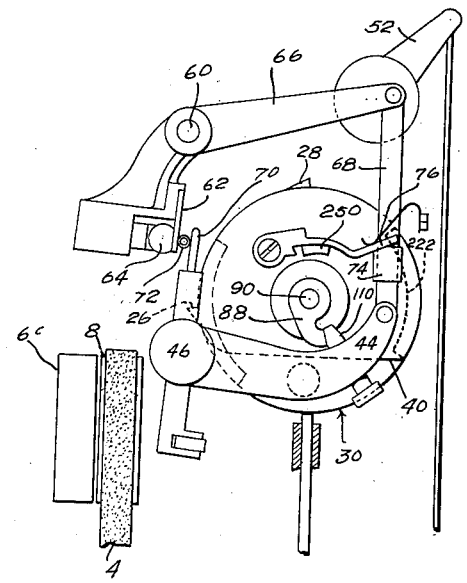
Fig. 17 is a similar view, showing the parts in initial winding position.

The result is that when the flat surface 40 reaches the roller 42 so as to permit the arm 44 to move upward, the traverse guides 70 which are carried by the load arm of the lever 44 together with the pressure plate 62 move toward the winding spindle 72 and into the positions shown in Fig. 17 when the spindle is free from windings. When the spindle is partly wound the pressure plate and traverse guide are pressed against the wind.

The link 68 carries an abutment 74 which as the movement just described takes place, is moved upward to engage the free end 76 of a detent 80 which is normally held downward by a spring 82. This detent is mounted upon a stud 84 which is fixed to the side frame 86 of the machine.

This detent 80 engages a pawl 88 carried by a shaft 90 mounted in a hollow bearing 92 carried by the side frames of the machine and on which the cam drum 30 is fixed by the set screw 94. Upon the other end of the shaft 90 is mounted a crank arm 96 which is connected by a link 98 to a lever 100 which has a forked lower end engaging a pin 102 on a belt shipper 104 mounted on studs carried by one of the side frames.

The pawl 88 is secured to the shaft 90 and is connected to one end of a coiled spring 106 within a housing formed on one end of the tubular bearing 92, the other end of the spring being secured to said housing, as shown at 108.

As the cam drum 30 revolves the hollow shaft 92 revolves with it putting the spring 106 under tension so that when the detent 80 is withdrawn from the pawl 88, the pawl 88 together with the shaft 90 is revolved about 180 degrees, thus turning the crank 96 and actuating the belt shipper 104 so as to move the belt 4 to pulley 8, as shown in Figs. 2 and 17.

The movement of the shaft 90 is limited by a stop 110 carried by the lever arm 44 which is then in its upper position as shown in Fig. 17.

Figure 10:
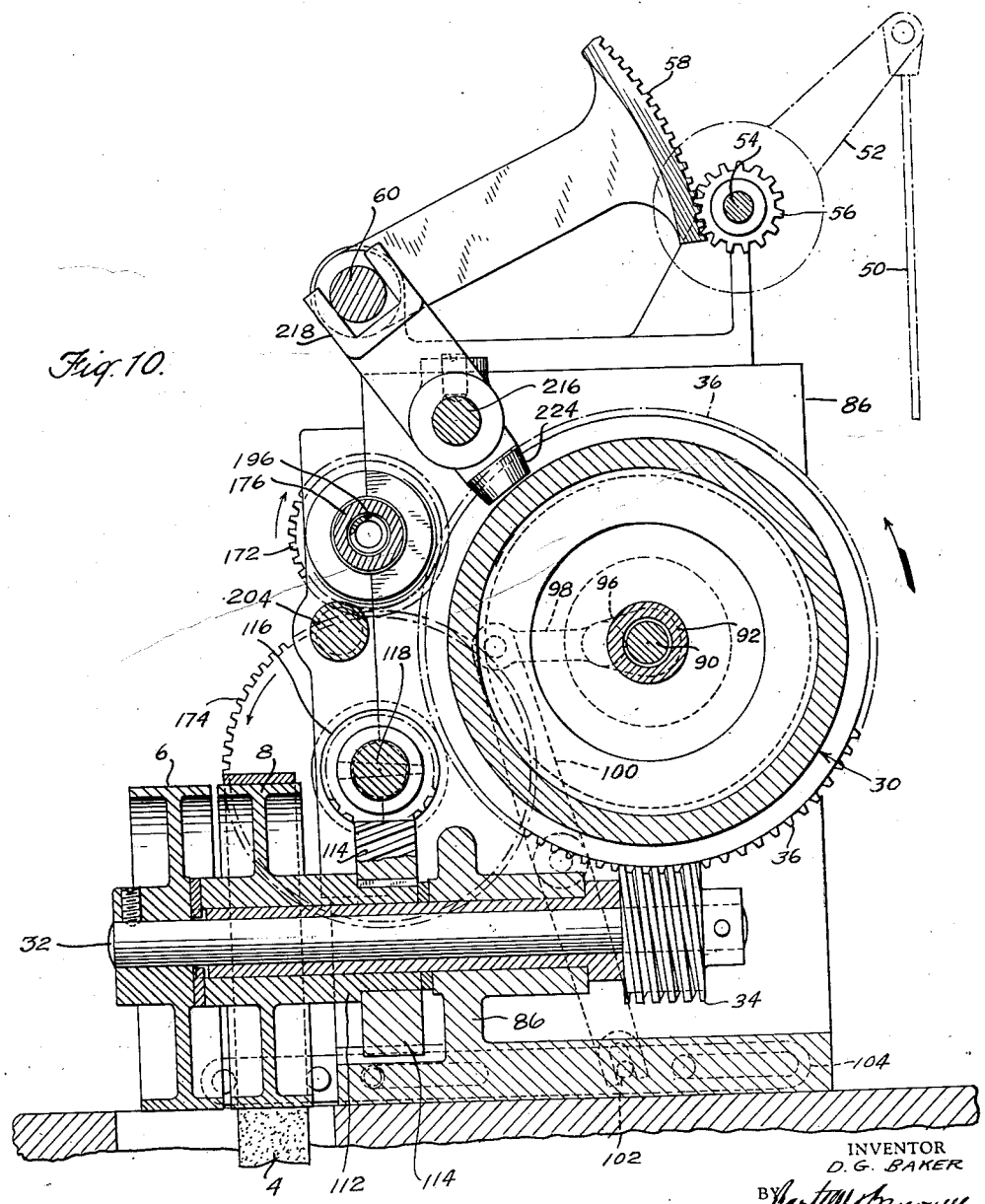
Fig. 10 shows a section on the line 10—10, Fig. 5.

The machine then starts to wind, the pulley 8 being upon a shaft 112, Fig. 10, upon the hub of which is mounted a helical gear 114 engaging a helical gear 116 mounted on the cam shaft 118 carrying a cam 120 rotating within a tubular bearing 122 fixed to the side frame 86 of the machine. On the exterior of the tubular bearing 122 is mounted a tubular member 124 connected to the arm 44 and constituting a pivotal support therefor. This member 124 has an upstanding rectangular projection 126 which is surrounded by a telescoping frame 128 having on its upper portion a wall 130 provided with circular journals for cylindrical bearings 132 which are provided with slots for rods 136 having traverse guide notches 138 at their upper ends. These rods 136 are held in the notches in the bearings 132 by cork blocks 139 and are pivoted at their lower ends 140 to a slide bar 142, sliding in a recess 144, one side of which is formed by the plate 146. This slide bar 142 has a downward projection 148 provided with a head 150 which is acted upon by the cam surfaces of the cam 120 so that when the cam 120 is revolved the guide notches 138 are oscillated about the axes of the bearing members 132.

In order to vary the throw of the ends carrying the guide notches 138 I provide means for moving the members 132 away from or toward the axis of the cam 120. These means consist of an extension 152 which embraces an extension 154 on the member 124 and is provided with an adjusting screw 156 passing through two members 158 of an abutment between which lies the knurled adjusting nut 160, which is held from accidentally turning by a spring pressed detent 162. By turning the nut 160 in one direction or the other the telescoping frame 128 together with the members 132 is raised or lowered so as to vary the throw of the ends containing the guide notches 138. The members 132 are held in position by a plate 164, and by adjusting screws 166 which are held in adjusted position by set screws 168.

From the foregoing it will be seen that rotation of the pulley 8 results in the oscillation of the notches in the ends of the traverse guides, which oscillation can be varied if desired.

170 is the winding spindle which is also actuated by the pulley 8 being connected to the shaft 118 by gearing 172 and 174 which may be changed in order to adapt the machine to wind the threads of different sizes, the gear 172 being mounted upon the hollow shaft 176 carrying the spindle 170. The ratio of the gears 172 and 174 is such as is necessary to make the well known Universal wind, as shown in Fig. 6.

The spindle 170 is an expansible spindle being composed of three loose members 178 whose inner ends are loosely held to the shaft 176 by an externally and internally screw-threaded cap 180 carrying a lock nut 182.

Figure 9:
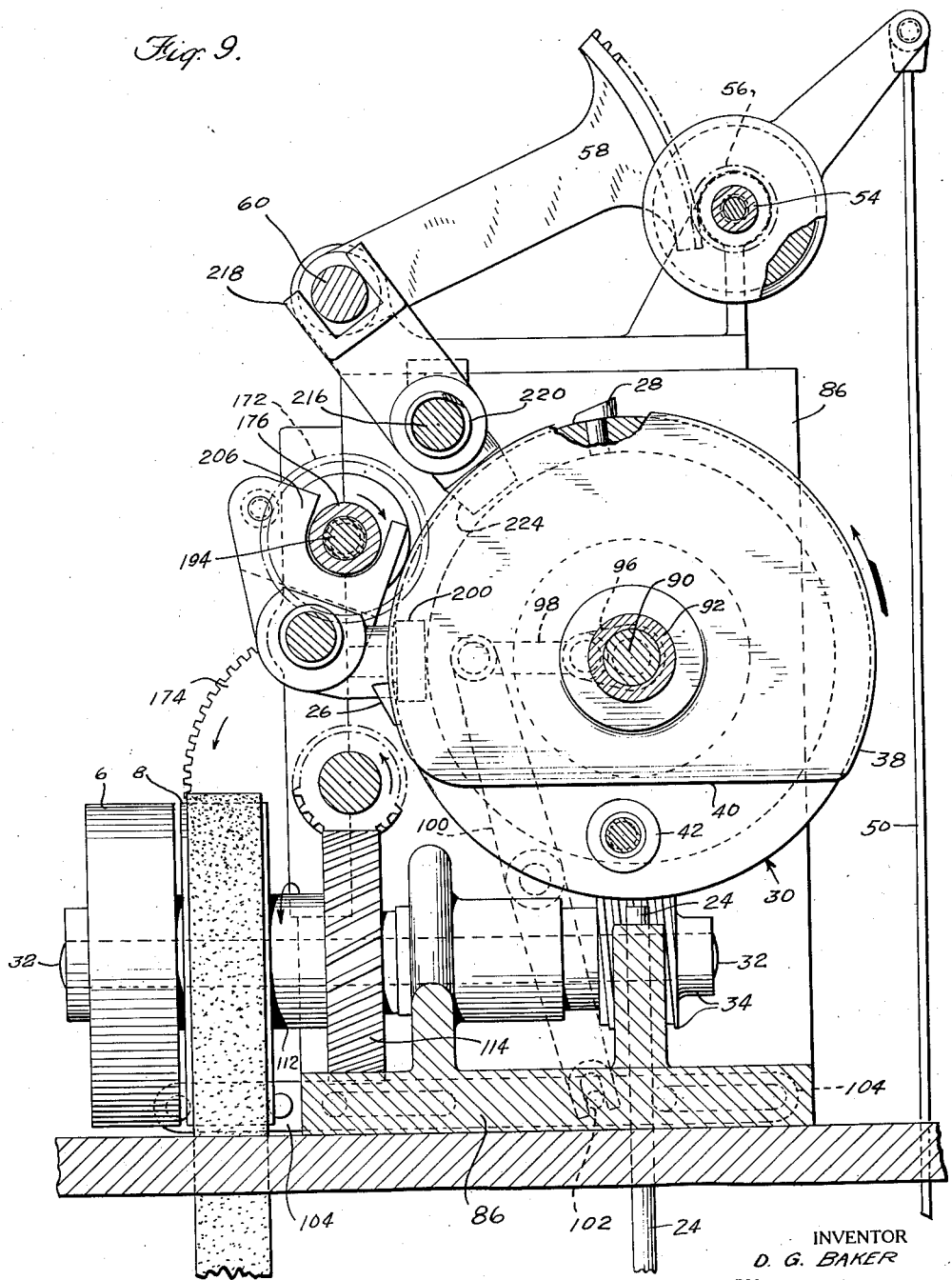
Fig. 9 shows a section on the line 9—9, Fig. 5.

Their outer ends are loosely embraced by a cap-like member 184. The inner ends of the segments 178 are provided with radially projecting portions 186 which lie in notches formed by projections 188 at the end of an internal bushing 190. These projections 188 make a driving connection between the spindle 170 and the shaft 176 and also serve to space the bottoms of the notches away from the flanged portions 186 so that the flanged portions are not closely clamped, but are free to move. Within the expansible spindle 170 is a tapered plunger 192 having a cylindrical base portion 194 within the shaft 176 and engaged by a compression spring 196 which tends to move the tapered plunger to spindle expanding position. The expanding plunger is released and retracted at the proper time by a cam surface 198 upon the cam drum 30 which engages an anti-friction roller 200 carried by a slide 202 mounted upon the fixed rod 204 and having a forked projection 206, Fig. 9, which engages abutments 208 secured to the plunger body 194 by a pin 210 passing through slots 212 in a shaft 176.

When the machine is in initial starting position, as shown in Fig. 16, the expanding plunger is held in retracted position and the spindle is collapsed.

In order to doff the bobbins when wound I provide a doffer 214 secured to a sliding rod 216 which is prevented from turning by the forked arm 218 embracing the shaft 60. The doffer is normally held in retracted position by a spring 220, as shown in Fig. 8, and as the cam drum 30 revolves is actuated by a cam surface 222 carried thereby engaging the anti-friction roller 224 mounted upon the base of the forked arm 218.

In order to vary the frictional drag upon the parts actuated by the weight 48 I provide a split bearing 226 having within it a brass bushing 228 which can be clamped by the screw 230 so as to be slightly compressed and vary its friction upon the shaft 60. This bushing 228 is screw-threaded and can be adjusted so as to position accurately the cutters 64 with relation to the traverse guide members and spindle, the position of the cutters being determined by the position of the pressure plate 62, having slots through which the cutters protrude. One of the slots of the pressure plate is narrow so as to quite closely engage one of the cutters and thereby determine the longitudinal positions of all of the cutters relatively to the pressure plate.

Figure 21:
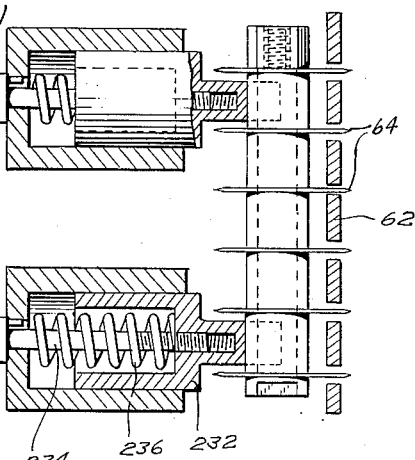
Fig. 21 is a detail sectional view taken on the line 21, Fig. 4.

The cutters 64 are circular blades rigidly secured to one another and separated by spacers forming a shaft which is supported behind the pressure plate by adjustable spring pressed plungers 232. These plungers have bearing recesses partially embracing the cutter shaft, as shown in Figs. 11 and 21. The plungers are adjusted by turn screws 234 passing through the springs 236 and screw-threaded into the plungers 232 so as to vary the projection of the cutters beyond the pressure plate 62.

The active cutting surfaces of these cutters lie below the pressure plate 62 and the arm which it carries and are, therefore, not in a position where they are liable to injure the operator or to be damaged and furthermore, these cutters are held in cutting position by the action of gravity on the weight 48 instead of being positively actuated, and are, for that reason, and also, for the reason that they project but a little distance less likely to do harm to the operator.

Figure 22:
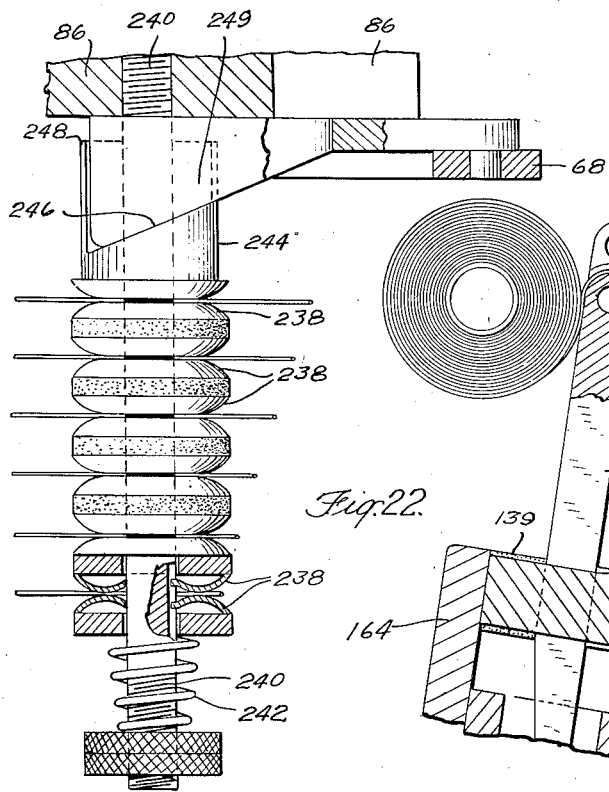
Fig. 22 is a view of the tension devices, partly in section, taken on the line 22—22, Fig. 4.
Figure 24:
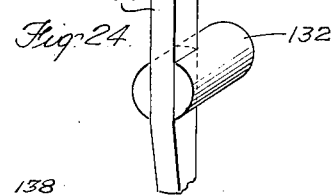
Fig. 24 is a perspective detail view of a portion of the traverse device.
Figure 23:
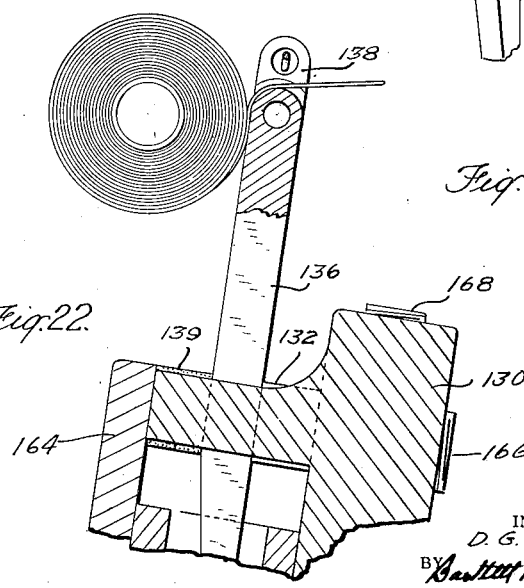
Fig. 23 is a detail sectional view on the line 23, Fig. 7.

The tension device is shown in Fig. 22 and consists of pairs of spring disks 238 between each pair of which thread passes. These are mounted upon a rod 240 and are held with a yielding pressure by a spring 242 at one end. The other end is provided with a movable bushing 244 having an inclined surface 246 and an extension 248 which lies between a forked wedge 249, the position of which governs the tension upon the threads. This position varies with positions of the pressure plate and traverse, the forked wedge being connected to the link 68. As the mass upon the spindle increases in size, the link 68 on account of the resulting movements of the levers 44 and 66 moves downward with the result that the forked wedge 249 is withdrawn more or less from the inclined surface 246 so as to relieve the tension of the thread.

The spring 82 keeps the detent 80 from vibrating so as not to make a disagreeable noise during the winding operation and also insures that the detent 80 is in position so as to engage the pawl 88 when it is released by the stop 110. This detent is provided with an abutment surface 250 which engages the exterior of the spring housing on the shaft 92 so as to properly position the detent in the path of the pawl 88.

The tubes on which the cops are wound vary in length and for that reason I provide as many cutters as I make cops, one cutter being located beyond the outer cop. This cutter, therefore, cuts off the extra length of the tube and at the same time severs the ends of the threads which have been wrapped around the tube for starting purposes, as indicated in Figs. 12 and 13.

Figure 18:
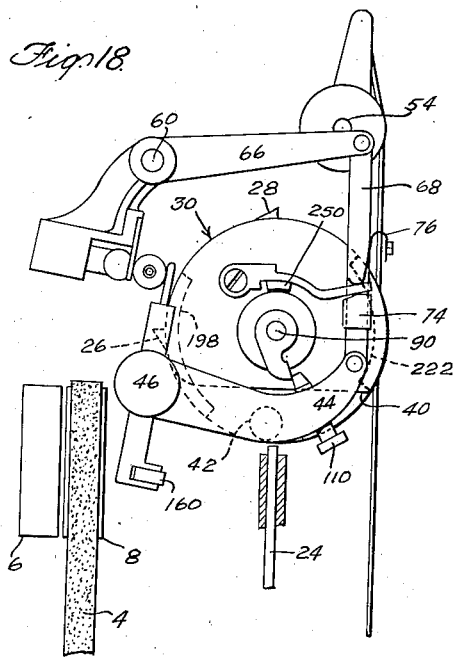
Fig. 18 is a similar view showing the parts when the winding is substantially completed.
Figure 19:
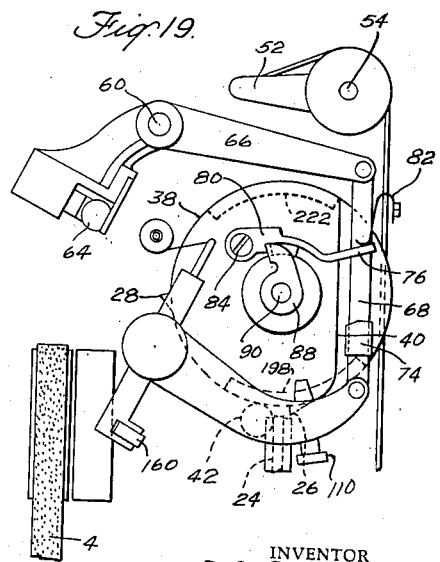
Fig. 19 is a similar view showing the parts just after the winding is completed.

When the parts are in initial position as shown in Fig. 16 the spindle is collapsed. The operator places a paper tube upon the collapsed spindle and wraps the free ends of the thread to be wound about the same, as shown in Fig. 12. The operator then depresses the treadle 14 with the result that the cam drum driven by the belt through pulley 6 begins to revolve, whereupon the anti-friction roller 200 is released so as to permit the expanded spindle to move and expand the spindle. Thereafter, the flat surface 40 of the cam 38 permits the traverse guide lever 44 to move upwardly bringing the traverse guides and the pressure plate against the tube with the thread wrapped thereon. The cutters by this movement are brought into contact with the tube. The upward movement of the traverse guide lever results in the release of the pawl 88 which causes the belt shipper to act and move the belt forward from the pulley 6 to pulley 8, Fig. 17, whereupon the cam drum stops and the winding spindle begins to operate. The cutters thereupon sever the tube into sections, simultaneously cutting the tube and thread between the winding stations and also at a point beyond the last winding station Fig. 12. The winding continues, the traverse guide 70 being actuated so as to produce the desired lay of the thread. As the mass increases in size the traverse guide lever 44 is depressed until the stop 110 is moved to the position shown in Fig. 18 whereupon the pawl 88 is again released and returns to its initial position, as shown in Fig. 19. When the pawl 88 is released by the stop 110 the belt shipper returns the belt from the pulley 8 to the pulley 6 whereupon the winding pulley stops and the cam drum again begins to operate, and continues to operate until the lug cam 26 engages the top of the rod 24 so as to release the treadle 14, permitting the belt 4 to slacken so as to stop the machine.

The machine is now stopped and the operator is now ready to receive the completed bobbins in her hand. She thereupon depresses the treadle 14 whereupon the rotation of the cam drum is resumed and the doffer cam 222 acts to cause the cops to be doffed with the exception of the last cop which is accessible and manually removed. After the doffing operation is completed and the doffer is moved back to its normal position the cam lug 28 engages the top of the rod 24 again depressing it so as to release the treadle 14 a second time, thus again stopping the drum.

Figure 20:
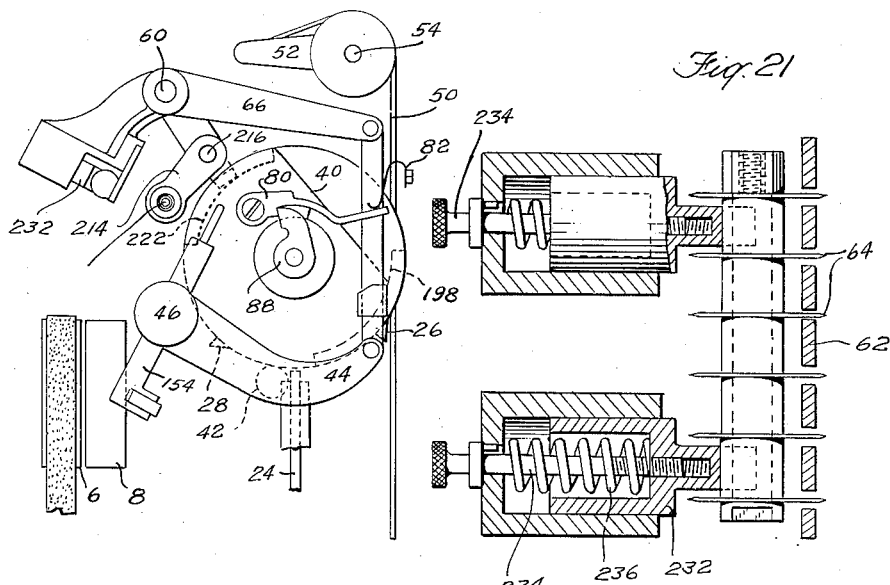
Fig. 20 is a similar view showing the parts with the machine in doffed position.

The position of the parts shown in Fig. 20 corresponds to the parts shown in Fig. 5 in which the doffer is in extreme forward position.

When the cam lug 28 engages the rod 24 and stops the machine a second time, the cycle on one complete revolution of drum 30 is completed and the parts are in what is known as initial starting position, Fig. 16, in which position a new tube is applied, after which the cycle is repeated.

As will be evident to those skilled in the art, my invention permits various modifications without departing from the spirit thereof or the scope of the appended claims.

What I claim is:

1. In a winding machine the combination of a winding spindle, means for rotating the same, a traverse guide and a pressure plate, means connecting the same and yielding means holding them in contact with opposite sides of the mass being wound on said spindle, and cutter knives projecting from the face of said pressure plate for severing a tube upon said spindle.

2. In a winding machine the combination of a winding spindle, means for rotating the same, a traverse guide and a pressure plate, means connecting the same and yielding means holding them in contact with opposite sides of the mass being wound on said spindle, and cutter knives projecting from the face of said pressure plate for severing a tube upon said spindle, and means for adjusting the position of said cutter knives.

3. In a winding machine the combination of a winding spindle, means for rotating the same, a traverse guide and pressure plate, means connecting the same and yielding means holding them in contact with opposite sides of the mass being wound on said spindle, and cutter knives projecting from the face of said pressure plate for severing a tube upon said spindle, said cutter knives being freely rotatable and extending through slots in said pressure plate.

4. In a winding machine the combination of a winding spindle, means for rotating the same, a traverse guide and a pressure plate, means connecting the same and yielding means holding them in contact with opposite sides of the mass being wound on said spindle, and cutter knives projecting from the face of said pressure plate for severing a tube upon said spindle, said cutter knives being freely rotatable and extending through slots in said pressure plate at a position below said lever.

5. In a winding machine a shaft, a cam thereon, a traverse guide in the form of a lever actuated by said cam, a fulcrum member carried by the frame of the machine and in the form of a rotatable bearing having a passage through which said guide passes and means for moving said bearing along said lever toward and from said cam so as to vary the throw of said guide.

6. In a winding machine the combination of a winding spindle, a tubular bearing, a cam within said bearing, a traverse guide actuated by said cam, an arm for moving said guide toward said spindle, a weight actuating said arm, a bearing for said guide, and means for relatively moving said guide longitudinally through said bearing so as to vary the throw of said guide and securing it in adjusted position.

7. In a winding machine the combination of a spindle, two levers having load arms on opposite sides of said spindle, one of said arms carrying a pressure plate and the other a traverse guide, the power arms of said levers being of equal length and connected together by a link, and a weight tending to actuate said levers to move said pressure plate and guide toward said spindle.

8. In a winding machine the combination of a spindle, two levers having load arms on opposite sides of said spindle, one of said arms carrying a pressure plate and the other a traverse guide, the power arms of said levers being of equal length and connected together by a link, and a weight tending to actuate said levers to move said pressure plate and guide toward said spindle, a segment secured to one of said levers and having its axis concentric with the fulcrum thereof, a gear meshing with said segment and a weight connected to said gear and tending to move the load arm of its lever toward said spindle.

9. In a winding machine the combination of a winding spindle, means for rotating the spindle, a traverse guide, a pressure plate, cutter knives for severing a tube placed on said spindle into a plurality of cops during the winding operation, and means for holding the traverse guide and pressure plate in contact with opposite sides of the mass of thread being wound and for actuating said cutter knives.

In testimony whereof, I have signed my name to this specification this eighteenth day of October, 1928.

DICKERSON G. BAKER.